Dec. 15, 1925.    1,565,398
C. B. ROSE
CLUTCH
Filed Nov. 28, 1921    2 Sheets-Sheet 1

Fig. 1

Inventor:
Charles B. Rose
by L.C. Shouts Atty

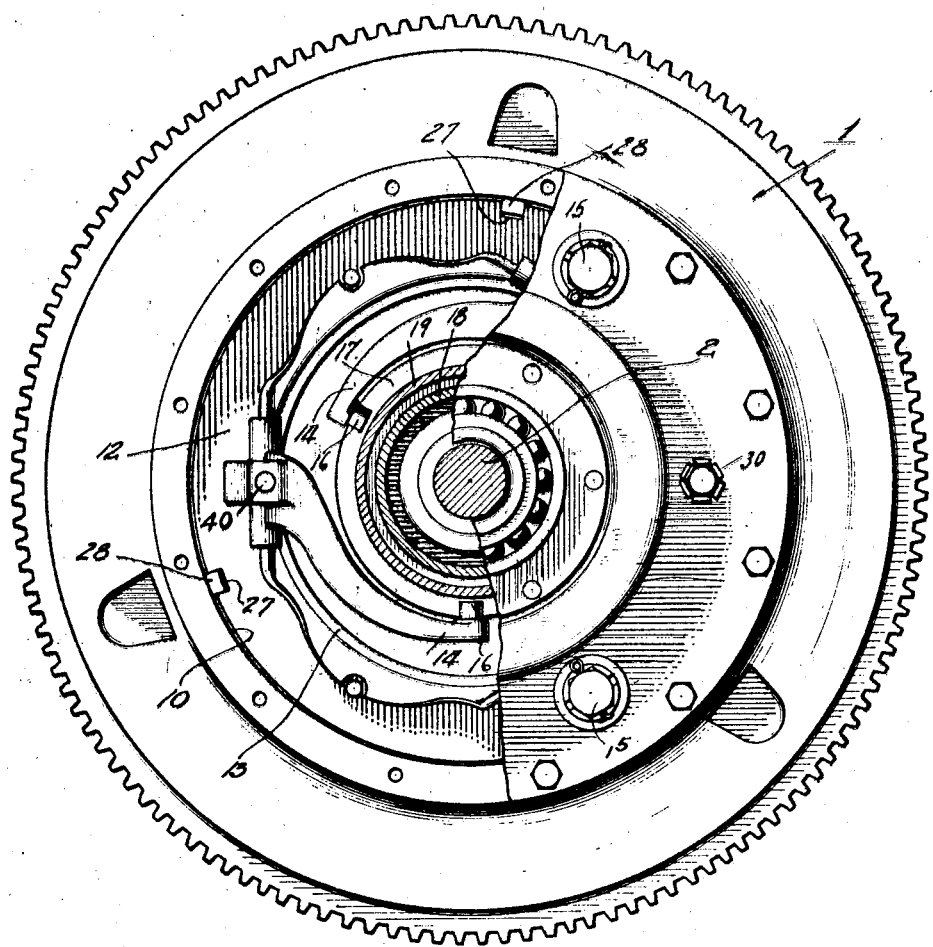

Patented Dec. 15, 1925.

1,565,398

UNITED STATES PATENT OFFICE.

CHARLES B. ROSE, OF EAST MOLINE, ILLINOIS.

CLUTCH.

Application filed November 28, 1921. Serial No. 518,114.

*To all whom it may concern:*

Be it known that I, CHARLES B. ROSE, a citizen of the United States, residing at East Moline, county of Rock Island, State of Illinois, 785—20th Avenue, have invented certain new and useful Improvements in Clutches, of which the following is a specification.

The invention relates to clutches.

It relates particularly to improvements in the type of clutch illustrated in my co-pending application, Serial No. 369,849 filed March 30, 1920, which has matured into Patent No. 1,507,518, granted September 2, 1924.

Clutches of this general type usually include a driving member comprising a flywheel having a hollow portion in which the clutch mechanism is located. The driven member comprises a shaft carrying a friction disk with which cooperate other friction disks inside the hollow portion of the fly-wheel. The friction disks are forced into engagement by means of levers actuated by a strong spring that bears against a back plate that forms a closure for the hollow opening in the fly-wheel and is attached to its rear face. It is difficult to assemble the clutch members, that is, the back plate, the spring, the levers, and the mechanism immediately associated therewith prior to inserting them in the hollow portion of the fly-wheel, such difficulty arising from the fact that the spring is quite strong and tends to force the members apart. Heretofore it has been necessary to provide special jigs or other devices to hold the members in assembled condition until mounted within the fly-wheel.

The present invention has for one of its objects to provide a clutch construction which will facilitate the clutch assembly and render unnecessary the provision of any special devices for assembly.

The clutch shown in the application above noted also includes a ring for transmitting pressure to the friction disks and bearing against this ring is a self-aligning device that transmits the pressure exerted on the operating levers.

When the clutch is engaged, considerable pressure is exerted on the ring-like member with the result that under certain conditions, the member may stick slightly when the clutch is disengaged, thereby causing friction and wear, and at the same time, leaving a slight space between the member and the self-aligning device, which permits the latter to wobble or chatter.

Another object of the present invention is to provide a construction that will overcome these objections and provide a means for positively retracting the ring-like member and for preventing the self-aligning device from chattering.

Other objects and advantages of the invention will appear from the specification and drawings.

An embodiment of the invention is shown in the accompanying drawings in which,

Figure 1 is a cross section of the clutch.

Figure 2 is an end elevation looking at the clutch from the rear with a portion of the back plate broken away.

Figure 4:
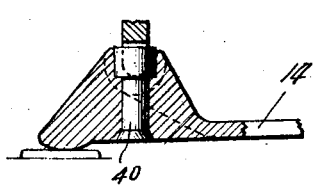
Figure 4 is a detailed section of one of the lever arms.
Figure 3:
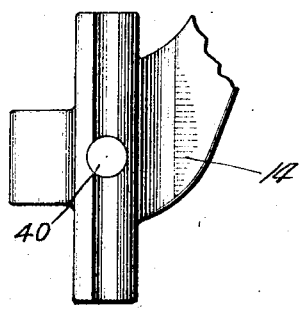
Figure 3 is a detailed elevation of the end of one of the lever arms.

The clutch comprises a driving member 1, a driven member 2, a plurality of friction disks, 3, 4, and 5, and an operating mechanism comprising a plurality of cooperating devices, which will be hereinafter referred to more specifically.

The driving member is in the form of a fly-wheel such as used in auto vehicles. An annular opening 10 is formed in the rear of the fly-wheel for the reception of the major portion of the clutch mechanism. On the rear face 11 of the fly-wheel is a back plate or closure which covers the fly-wheel opening.

The driven member 2 is a shaft, usually the drive shaft of an auto vehicle.

The friction disks 3, 4 and 5 are prferably annular in shape and slightly smaller in diameter than the opening 10 in the fly-wheel. The disk 4 is keyed to the shaft 2, while the disks 3 and 5 are loose, one bearing against the inner end of the opening 10 in the flywheel and the other serving to bear against the disk 4.

The operating mechanism includes a pressure-transmitting ring 12, a self-aligning ring 13, and a plurality of levers 14, the outer ends of which bear against adjustable fulcrums 15 and against the self-aligning ring 13. The inner ends of the levers are provided with cylindrical projections 16 positioned in an annular space 17 between the sleeve 18 and the collar 19. Bearing against the collar 19 is a spring 20, the other end of which bears against the back or cover plate 21. Adjustable connecting members 22, of which only one is shown, connect the pressure-transmitting ring 12 and the back plate, the function of which members will be later described in more detail.

The sleeve 18 has a rear extension forming a support for a bearing 23 to which is connected an actuating device (not shown) for sliding the sleeve backward. When the sleeve is moved downwardly as illustrated in Figure 1, the spring 20, which is initially under compression, is compressed still more and the levers 14 are moved so as to relieve pressure on the self-aligning ring 13. This releases the clutch. When the actuating device is released, the sleeve 18 automatically moves upwardly due to the pressure exerted by spring 20 and the levers 14 are moved so as to transmit pressure through the rings 13 and 12 to the friction disks to engage the clutch.

The fulcrums 15 are made adjustable so that the effective action of the levers, of which there are preferably three, may be adjusted.

It is difficult under normally operative conditions to adjust these fulcrums equally, and in order to insure that the pressure on the friction disks shall be equal, an equalizing ring 13 is provided having a spherical surface 25 that engages a complementary surface 26 on the pressure-transmitting ring 12. The ring 13 will automatically adjust itself even though there be discrepancies in the adjustments of the fulcrums 15. This ring will insure equal wear on the clutch disks and equalization of the pressure exerted by the levers. The advantages of this construction and its manner of operation are described in more detail in my co-pending application.

Referring to Figure 1, it will be evident that if means were not provided to prevent it, the pressure transmitting ring 12, the friction disk 5 and the equalizing member 13 might not always move away from the friction disk 4 when pressure on the latter is removed. Also, since the equalizing member 13 is mounted to rotate with the fly wheel, it might rotate relative to the pressure transmitting ring 12. The result would be a certain amount of sticking, wobbling, and chattering.

In order to prevent relative rotation of the parts, the ring 12 is provided with a slot 27 in which is positioned the head of a bolt or stud 28 fixed in the fly-wheel, and in order to insure that the ring 12 will be retracted every time the clutch is disengaged, a bolt 22 is screwed into the ring and extended rearwardly through the back plate 21 in which is positioned a cup 30 containing a spring 31, one end of which bears against the bottom of the cup and the other against the head of the bolt. This spring normally biases the bolt and the attached ring 12 outwardly or downwardly as viewed in Figure 1, so that whenever pressure is relieved from ring 12, that ring will be moved by spring 31 out of engagement with friction disk 5. The bolt 22 extends through slots 32 in the self-aligning ring 13, thereby preventing relative rotation of rings 12 and 13. It will be understood that there are three or more bolts 22 in the clutch, only one of which has been shown and described, but all of which are alike.

This construction has the following advantages:

First, it insures that the ring 12 will be retracted whenever the clutch is disengaged and it thereby prevents undue wear between the parts because of relative rotation. Second, it prevents chattering of the member 13 because the ring 12 is resiliently held in engagement with that ring. Third, it prevents relative rotation of the ring 12 and the self-aligning ring 13. Fourth, it facilitates the assembly of the clutch as will now be described.

From Figure 1, it will be observed that unless the sleeve 18 and its associated levers be held in position, and unless the back plate 21 be also held in position, the spring 20 will force these members apart. When the clutch is completely assembled these members are held in position and no such action takes place, but during the assembling operation it is necessary to hold these parts in position for the assembling operation. This is usually done by some jig or fixture built especially for the purpose, but in the present device, such special fixtures are not necessary because the bolts 22 which are screwed into the ring 12 hold these parts together. Pressure of spring 20 which is transmitted to the levers 14 presses against the self-aligning member 13 and against the ring 12, but that ring will not separate except to a limited extent, because of the bolts 22, the heads of which will bear against the back plate 21. The springs 31 may be compressed more than usual during this operation but that pressure will be relieved as soon as the clutch is completely assembled. This greatly facilitates the process of clutch assembly and is an important advantage in lowering the cost of production.

Another important advantage is that, should it be necessary to take the clutch apart for repairs, the working parts will be held together whereas in previous constructions the operating spring would cause all the parts to fly apart.

The most of the metal parts of the clutch are made from stampings, thereby decreasing the cost and facilitating production. The self-aligning feature 13 permits a certain amount of variation in these parts without destroying the efficiency of the clutch. For example, the rear face of the fly-wheel need not be machined accurately because the fulcrums 15 need not be adjusted absolutely accurately, the self-aligning member taking care of any inequalities in adjustment.

A hardened pin 40 may be inserted in the ends of levers 14, as illustrated most clearly in Figure 4, in order to improve the wearing qualities of the bearing surfaces of these levers.

It is to be understood that the construction is for purposes of illustration only and that other structures may be devised without departing from the spirit and scope of the appended claims.

I claim:

1. In a clutch, the combination of a driving member, a driven member, friction means for connecting and disconnecting said members, a back plate, a clutch operating mechanism including a pressure member, a self-aligning device, and means tending to separate the back plate and portions of the operating mechanism, holding means serving to hold the operating mechanism and back plate together against the force of the means tending to separate them so that the operating mechanism and back plate may be removed from the clutch as a unit, said means also cooperating with the self-aligning device to insure that it rotates with the operatating mechanism, and means associated with the holding means for rendering it active to automatically retract the pressure member when pressure thereon is relieved.

2. A clutch having a driving member, a driven member, friction means for operatively connecting said members together, a pressure transmitting ring, clutch operating means for exerting pressure on and relieving pressure from said ring, said means including a self-aligning device for automatically equalizing the pressure on said ring, and means for automatically retracting said ring when pressure thereon is relieved, said means also serving to insure that the equalizing device will rotate with the ring.

3. A clutch having a driving member comprising a fly-wheel provided with a hollow portion for receiving a clutch mechanism, a driven member, friction means for operatively connecting said members, a pressure transmitting ring, a plate for closing the opening in the fly-wheel, operating means between the friction means and plate for exerting pressure on and relieving pressure from said pressure transmitting ring, said operating means including a self-aligning device for engaging the pressure transmitting ring, a series of adjustable bolts extending from the back plate to the pressure ring, and springs for biasing said bolts to automatically retract the pressure ring and hold it in engagement with the self-aligning device when pressure on it is relieved.

4. A clutch having a driving member, a driven member, friction means for operatively connecting said members, a pressure-transmitting device, operating meanse for exerting pressure on and relieving pressure from said pressure-transmitting device, said operating means including a mechanism for automatically equalizing the pressure on the pressure-transmitting device, and means for retracting said pressure-transmitting device and resiliently holding it in engagement with the equalizing means when pressure on said device is relieved.

5. A disk clutch having a driving member, a driven member, friction disks for operatively connecting said members, an annular ring for transmitting pressure to said disks, a self-aligning device engaging said ring, operating means for exerting and relieving pressure on said self-aligning device, and means for retracting said ring when pressure on the self-aligning device is relieved.

6. A disk clutch having a driving member, a driven member, friction disks for operatively connecting said members, an annular ring for transmitting pressure to said disks, means for preventing rotation of said ring, an annular, spherical, self-aligning device in contact with said ring, mechanism for exerting and relieving pressure on said self-aligning device, and adjustable resilient means for biasing said ring so that when pressure on the self-aligning device is relieved, the ring will be operatively disconnected from the friction disks and held in contact with the self-aligning device.

7. A clutch having a driving member, a driven member, friction means for operatively connecting said members, a pressure-transmitting ring, operating means for exerting pressure on and relieving pressure from said ring, said operating means including a self-aligning ring adapted to contact the pressure ring for automatically equalizing the pressure thereon, and means for retracting said pressure ring and holding it in contact with the equalizing ring when the operating means is actuated to relieve pressure on said rings.

8. A clutch having a driving member, a driven member, friction means for operatively connecting said members, a pressure-transmitting ring, a back plate, operating means for exerting pressure on and relieving pressure from said pressure ring, said operating means including a self-aligning ring adapted to contact the pressure ring to automatically equalize the pressure thereon, and means between the pressure ring and the back plate for retracting the pressure ring and holding it in contact with the equalizing ring when the operating means is actuated to relieve pressure on said rings.

In testimony whereof, I affix my signature.

CHARLES B. ROSE.